Sept. 1, 1925.

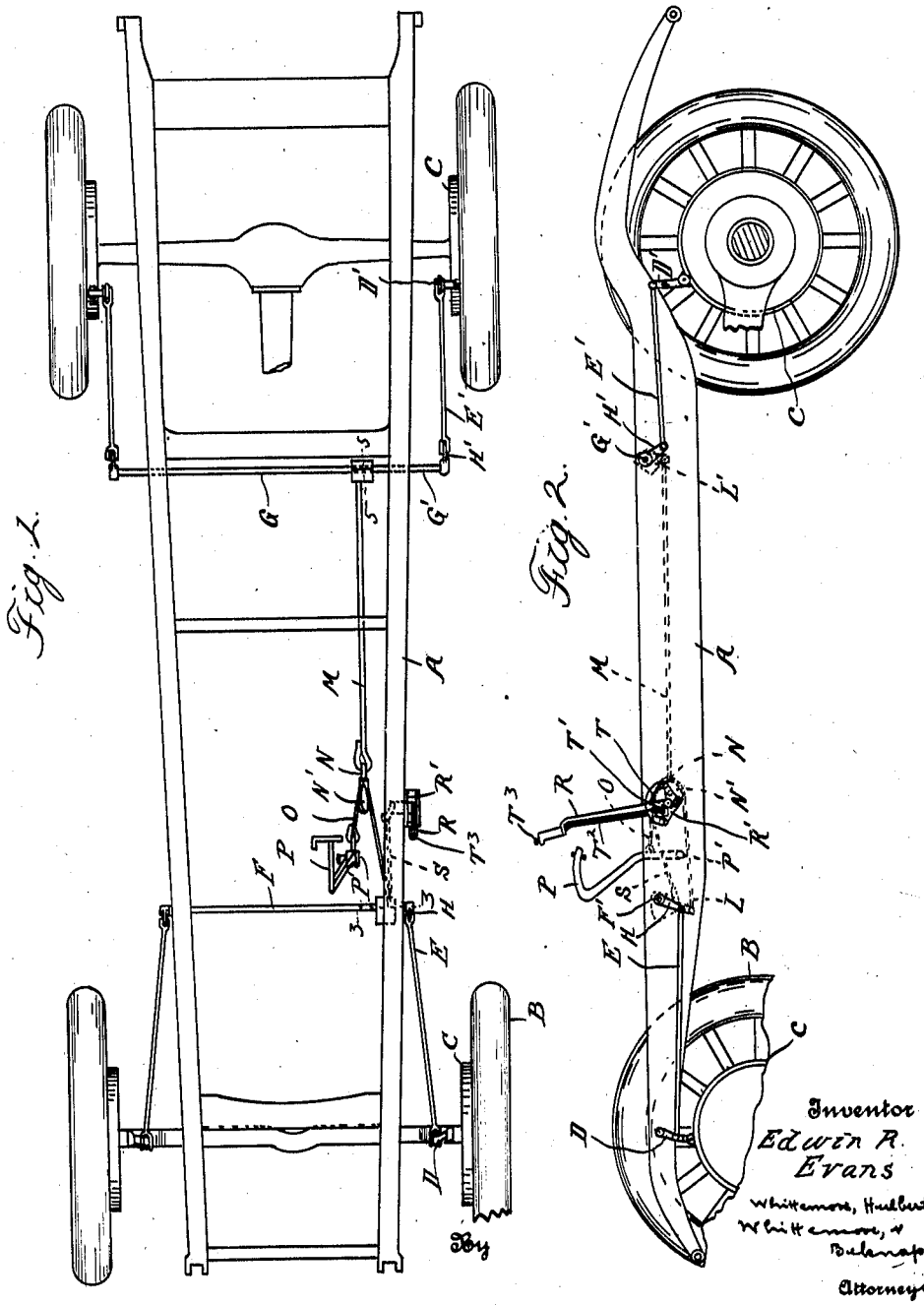

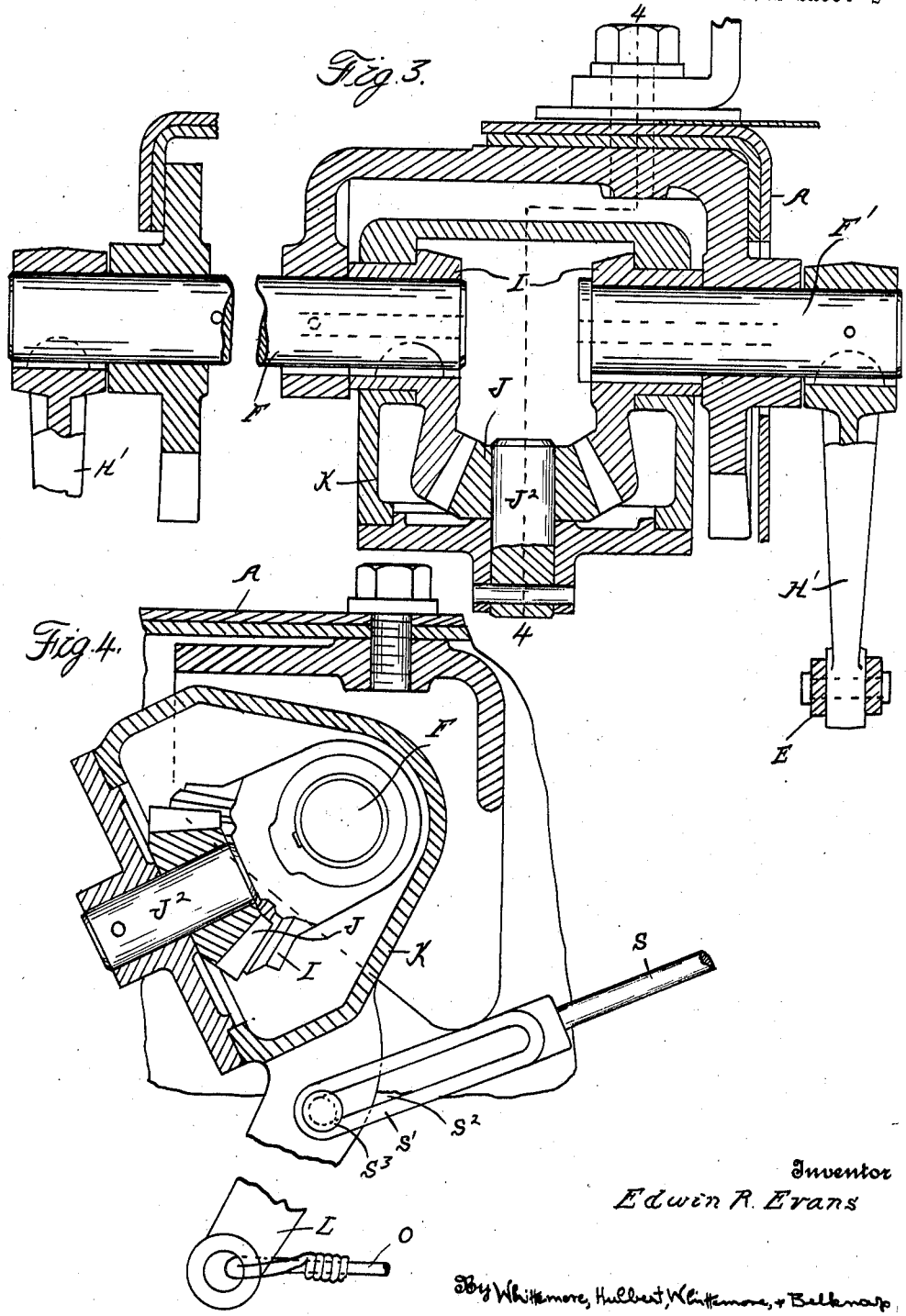

E. R. EVANS 1,551,871

BRAKE MECHANISM

Filed Dec. 18, 1922    3 Sheets-Sheet 3

Inventor
Edwin R. Evans

By Whittemore, Hulbert, Whittemore, & Belknap
Attorneys

Patented Sept. 1, 1925.

1,551,871

UNITED STATES PATENT OFFICE.

EDWIN R. EVANS, OF DETROIT, MICHIGAN.

BRAKE MECHANISM.

Application filed December 18, 1922. Serial No. 607,673.

*To all whom it may concern:*

Be it known that I, EDWIN R. EVANS, a citizen of the United States of America, residing at Detroit, in the county of Wayne and State of Michigan, have invented certain new and useful Improvements in Brake Mechanisms, of which the following is a specification, reference being had therein to the accompanying drawings.

This invention relates to brake mechanism for motor vehicles and relates particularly to mechanisms for establishing a common control over brakes acting upon all four wheels of a vehicle.

It is the object of the invention primarily to insure equalization of braking forces acting on a plurality of vehicle wheels.

In the drawings:—

Figure 1 is a plan view of a motor vehicle chassis showing the improved brake mechanism;

Figure 2 is a view of the same in side elevation;

Figure 3 is a cross section on line 3—3 of Figure 1 showing the provision for equalizing the braking effort transmitted to the front wheels;

Figure 4 is a cross section on line 4—4 of Figure 3;

Figure 6:
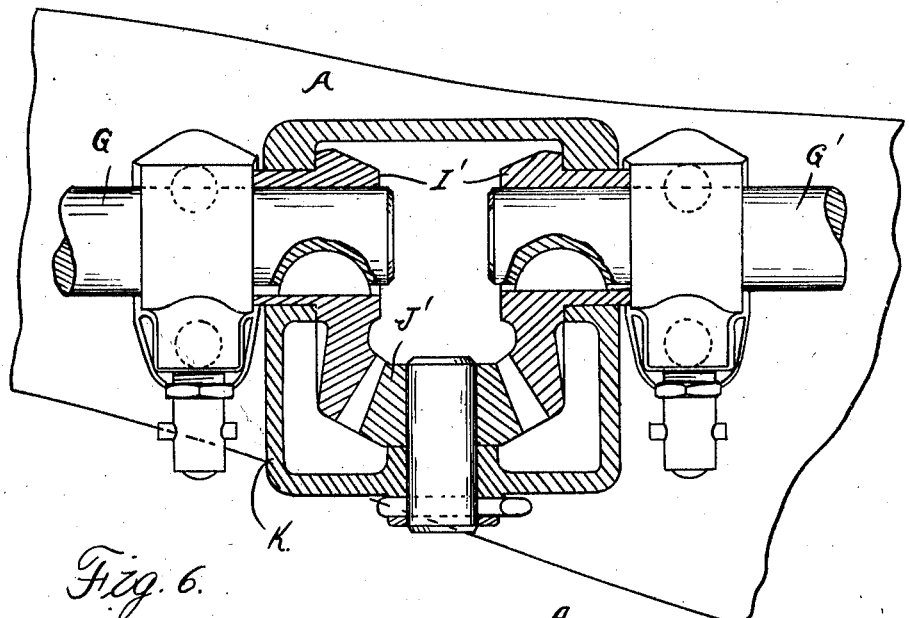
Figure 6 is a section on line 6—6 of Figure 5.
Figure 5:
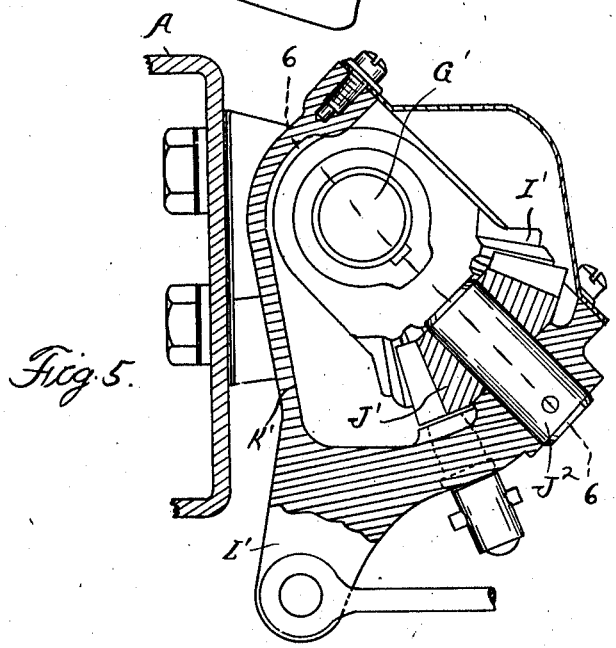
Figure 5 is a detail sectional view on line 5—5 of Figure 1 showing a similar provision for equalizing the braking effect upon the rear wheels.

In these views the reference character A designates the frame of a motor vehicle and B the wheels thereof. Both the front and the rear wheels are provided with brake drums C. The particular mechanism for frictionally gripping said drums is no feature of the present invention and has not been illustrated as various forms of such mechanisms are well known. D and D' are pivotal arms for respectively actuating the brakes of the front and rear wheels. E and E' are pull rods respectively engaging said arms, said rods extending rearwardly from the front brakes and forwardly from the rear brakes. Upon the central portion of the frame A there are journalled front and rear pairs of aligned rock shafts F, F' and G, G' respectively, said shafts extending transversely of the frame. Upon the outer ends of the front shafts F, F' at each side of the frame A depending arms H are mounted fast and are pivotally engaged by the rear ends of the pull rods E and a similar pair of arms H' upon the rear rock shafts G, G' are pivotally engaged by the forward ends of the rear pull rods E'. The inner or adjacent extremities of the rock shafts F, F' carry segmental bevel gears I, each pair of which meshes with a bevel pinion J. Each gear J is journaled upon a pin J² carried by a casing K enclosing the gears I and J, and journaled jointly upon the shafts F, F'. Similarly, segmental bevel gears I' are mounted fast upon the adjacent ends of the rear rock-shafts G, G', and are intermeshed with a bevel pinion J', said gears and pinion being enclosed within a casing K' upon which the pinion J' is journaled. Arms L and L' project integrally downward from the casings K and K', the arm L having a length considerably greater than that of the arm L', M is a pull rod forwardly extending from the arm L' and having pivotally secured to its front end a yoke N in which is journaled a sheave N'. O is a flexible cable secured to a foot lever P a predetermined distance above the pivoted lower end P' of said lever, said cable being rearwardly extending to the sheave N', making a half turn around said sheave and extending forwardly from the sheave for attachment to the lower end of the arm L.

In the operation of the described invention when the foot lever P is forwardly rocked, the cable O transmits a forward pull to the rod M and a rearward pull to the arm L. The pull of the rod M acts through the arm L' to rock the rear casing K forwardly and the front casing K' is rearwardly rocked by the arm L. The gears J and I form a means of communicating the rocking movement of the casings K and K' to the shafts F, F' and G, G' and equalization of the forces acting upon the aligned shafts is insured by freedom of the gears J to undergo planetary travel with respect to the gears I. Thus the two trains of gearing J, I respectively provide for equalization of the braking forces acting upon each of the front wheels and each of the rear wheels. Furthermore the mechanism through which the brake force is transmitted to said gear trains is such as to equalize the forces acting upon the respective trains so that the total braking force acting upon the front wheels will be equal to that acting upon the rear ones. This equalization follows from the fact that the cable O transmits its force in a predetermined definite ratio to the pull rod M and arm L. The force acting upon the rod M will exceed that acting upon the arm L owing to the greater mechanical advantage under which the force is applied to said rod. Compensation is made, however, for this difference of forces by making the arm L longer to a predetermined extent than the arm L' which said pull rod engaged. Thus the arrangement is such as to insure a perfect equalization of the forwardly and rearwardly transmitted braking forces. Since the most convenient location for the gearings I, J and casings K, K' is in close proximity to one of the sills of the frame A, the rock shafts F and G have a sufficient length to extend substantially across said frame while the shafts F' and G' are comparatively short.

For emergency use the invention provides also a lever control for the front wheel brakes with a provision for locking said brakes in said position. Thus R is a lever pivoted on a bracket R' secured exteriorly to one of the sills of the frame A and S is a pull rod extending from an arm S' on the shaft of said lever to the arm L and having a lost motion connection to the latter arm so that there will be no interference by said pull rod and lever with the control transmitted from the pedal P. Thus S² is a longitudinal slot in the forward end of the rod S and S³ is a pin upon the arm L engaging in the slot S². When the pedal is actuated the slot S² permits the pin S³ to move rearwardly without affecting the pull rod. Since, however, the pin normally occupies the forward end of the slot S² the arm L will be immediately responsive to a rearward actuation of the lever. The bracket R' rigidly carries a toothed sector T, the teeth of which are engageable by a pawl T' to hold the lever R in brake setting position. T² is a rod controlling the pawl T' and T³ abutting upon the upper end of said rod for actuating the same.

The lever R provides for applying a braking force to the front wheels independently of the rear wheels and further permits locking of the front wheels under restraint of the brakes so that the vehicle may be prevented from accidental movement when in use.

What I claim as my invention is:—

1. A brake mechanism comprising brakes acting upon each of the four wheels of a vehicle, a rockable actuating member for said brakes, rock arms through which the front and rear pairs of brakes are respectively controlled, a cable transmitting control from said actuating member to said rock arms, and a sheave intermediately engaged by the cable transmitting control to one of said arms, the increased mechanical advantage gained by the arm actuated through said sheave being compensated for by giving the other arm a relatively great length.

2. A brake mechanism comprising front and rear pairs of brakes, devices for equalizing the forces acting upon the brakes of each of said pairs, and a device for equalizing the total forces acting upon the front and rear pairs of brakes comprising a cable transmitting the braking force to the front equalizing device, and a sheave intermediately engaged by said cable transmitting the braking force to the rear device.

3. A brake mechanism comprising front and rear pairs of brakes, front and rear pairs of rock shafts controlling said brakes, the shafts of each pair being aligned transversely of the vehicle, rock arms for respectively actuating said pairs of rock shafts, means for equalizing the forces acting upon the rock shaft from said arm, a rockable actuating member, a cable forming an actuating connection from said member to the forward rock arm, a tension member extending forwardly from the rearmost rock arm, a sheave journaled at the forward end of said tension member, said sheave being engaged by an intermediate portion of said cable.

4. A brake mechanism comprising front and rear pairs of brakes, devices for equalizing the braking force transmitted to the brakes by each of said pairs, a pivotal member for actuating both pairs of brakes, and a cable having one end connected to said pivotal member, and the other engaging one of said devices, a sheave intermediately engaging said cable, and means connected to said sheave for actuating the other of said equalizing devices.

5. A brake mechanism as set forth in claim 4, said sheave being adjustable through said cable longitudinally of the vehicle to transmit a braking force to the equalizing device connected to said sheave.

6. A brake mechanism comprising front and rear pairs of brakes, a common actuating member for the same, devices for equalizing the braking forces applied to the brakes of each of said pairs, a flexible member connected at one extremity to said actuating member, and having its other extremity engaging one of said actuating devices, and a member intermediately engaged with said flexible member and having an actuating connection with the other equalizing device.

In testimony whereof I affix my signature.

EDWIN R. EVANS.